2 Sheets—Sheet 1.
C. B. HEWITT.
Well-Boring Apparatus.
No. 196,526. Patented Oct. 30, 1877.
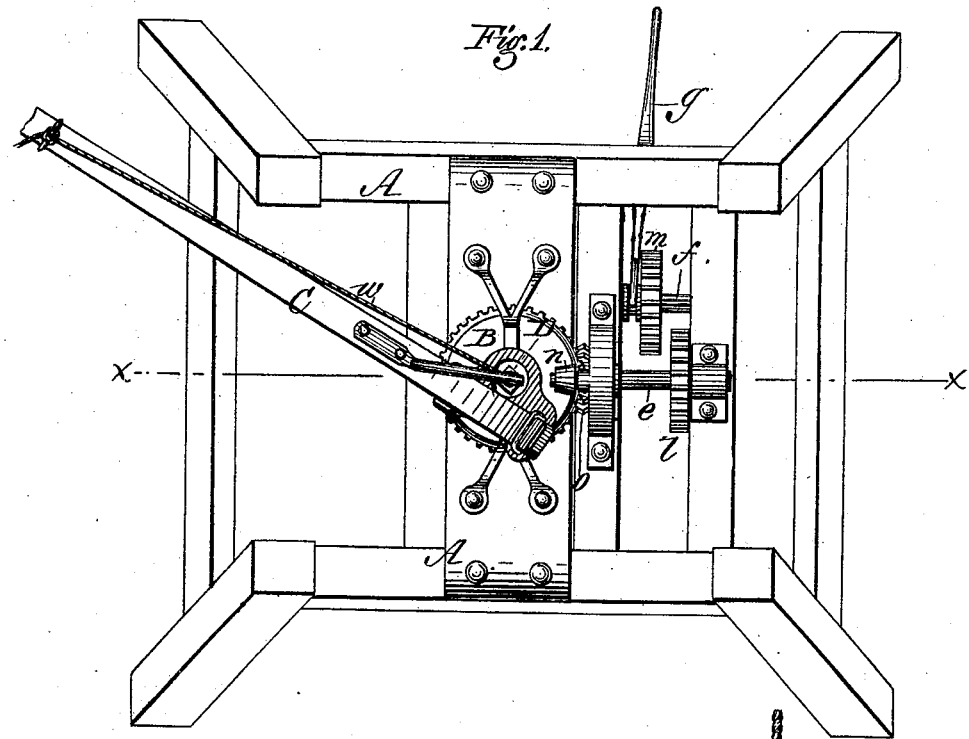
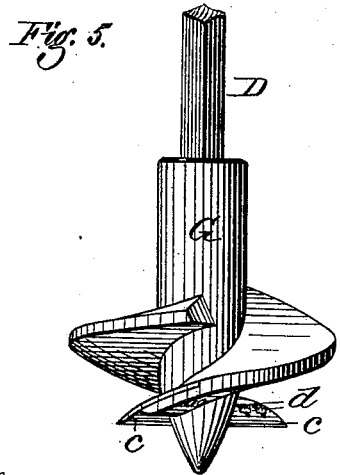
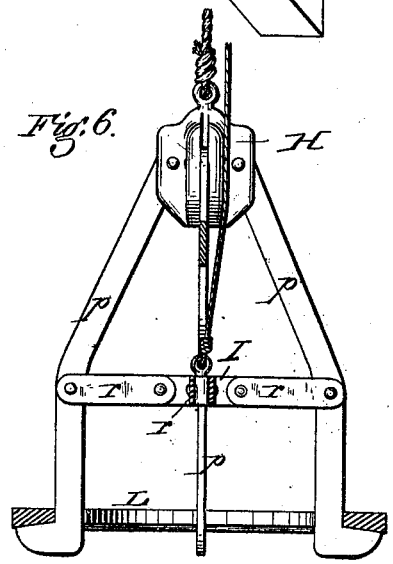
Witnesses:
Will W. Dodge
Donn P. Twitchell
Inventor:
C. B. Hewitt
By his atty
Dodgerson

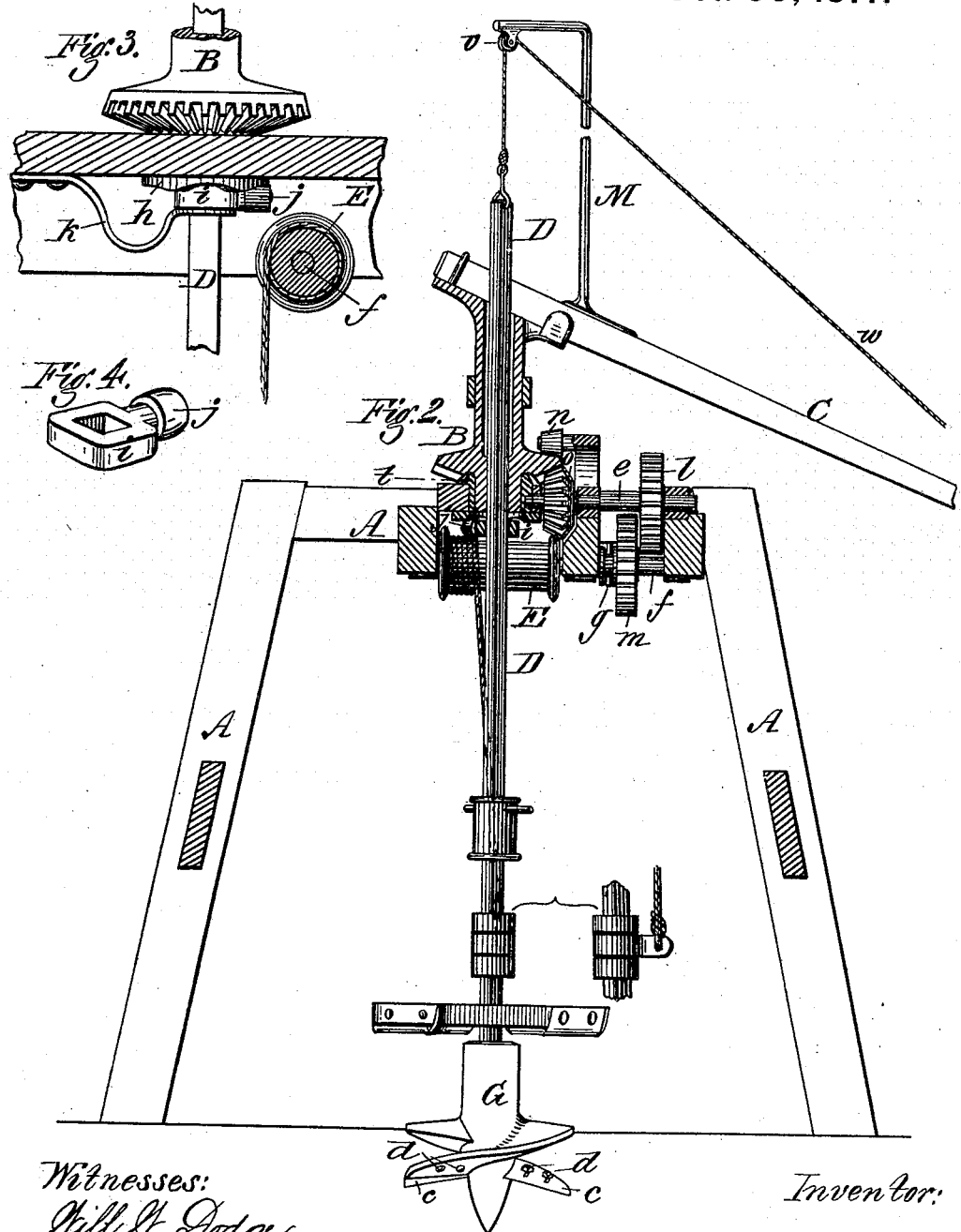

UNITED STATES PATENT OFFICE.

CHARLES B. HEWITT, OF RACINE, WISCONSIN.

IMPROVEMENT IN WELL-BORING APPARATUS.

Specification forming part of Letters Patent No. 196,526, dated October 30, 1877; application filed August 3, 1877.

*To all whom it may concern:*

Be it known that I, CHARLES B. HEWITT, of Racine, in the county of Racine and State of Wisconsin, have invented certain Improvements in Well-Boring Apparatus, of which the following is a specification:

The invention relates to that class of earth-boring machines in which a square shaft, provided at its lower end with a boring tool or auger, passes vertically through a drum or capstan mounted on a suitable frame-work and rotated by means of a sweep, the capstan being provided with cogs or gear-teeth, by which motion is imparted to a windlass for elevating the auger; and the improvements consist in so mounting and arranging the windlass that the rope by which the boring tool or auger is raised shall pass in a vertical or nearly vertical line to said windlass, avoiding the use of all intermediate pulleys, and causing the boring tool or auger to be lifted straight up instead of being drawn to one side; in a novel means of raising the auger-shaft; in a device for automatically feeding or forcing the auger-shaft downward; in the use of a follower for retaining the capstan or drum in place; and in the peculiar construction of the boring tool or auger, all as hereinafter explained.

In the drawings, Figure 1 represents a top plan view of the boring apparatus; Fig. 2, a vertical section of the same on the line $x\ x$ of Fig. 1; Fig. 3, a view of the feeding device or mechanism for forcing the auger into the ground; Fig. 4, a view of one of the parts of the same detached; Fig. 5, a side view of the improved boring tool or auger; and Fig. 6, a view of the bricking frame or carriage for lowering the brick-work or masonry into the well, a portion being broken away to show the construction more clearly.

In constructing this improved apparatus there is first provided a strong frame, A, of wood, upon the upper side of which is mounted in a central position a capstan or drum, B, as shown in Figs. 1 and 2, the lower end of said drum or capstan being formed or provided with cogs or gear-teeth, as shown more clearly in Fig. 3. The lower end or portion of the capstan is mounted in and rests upon a circular metallic support or bearing, $t$, it being prevented from rising up off of said support or bearing by means of a roller or follower, $n$, engaging over its enlarged lower portion, as represented in Figs. 1 and 2.

The drum or capstan B has a central vertical opening, squared at least a portion of its length, through which passes a square metal shaft, D. Secured to the lower end of this shaft D is the boring tool or auger G.

A sweep or beam, C, is attached at any suitable point to the drum or capstan B, it being, however, preferred to attach it, as represented in Fig. 2, at an angle, whereby its outer end is brought to a convenient height for attaching the draft-animals. From the upper side of the sweep C there extends upward to a considerable height a strong rod, M, having its upper end bent out over the center of the capstan, and provided at that point with a pulley, $v$, as represented in Figs. 1 and 2. A cord or rope, attached to the upper end of the shaft D, passes over this pulley $v$, and serves as a convenient means of elevating the shaft. The cord has its free end secured lightly to the sweep C, and the sweep-rod M and cord or rope $v$ all travel around together, so that the latter are always in the proper position for use.

As represented in Figs. 1 and 2, a pinion, $o$, is so mounted as to mesh or gear with the cogs or teeth on the lower end of the drum or capstan B; and on the same shaft $e$ which carries the pinion $o$ there is mounted a fixed gear-wheel or pinion, $l$. Parallel to the shaft $e$, and somewhat below and in rear of the same, is a similar shaft, $f$, furnished with a spline, and carrying a sliding gear-wheel or pinion, $m$, which is arranged to be thrown into or out of gear by means of a lever, $g$. On this same shaft $f$ is also mounted the windlass E in a horizontal position, it being so placed that its circumference approaches very close to the central shaft D, so that the cord or rope which passes from the latter to the former passes in a nearly vertical line thereto.

The pinion $o$, being always in gear with the capstan or drum B, will cause the pinion, together with its shaft $e$ and the gear-wheel $l$, to rotate whenever the capstan revolves; but, by throwing the gear-wheel $m$ out of gear with the wheel $l$, the drum ceases to be affected by the rotating of the other parts. When, however, it is desirable to hoist the auger or boring-tool, it is only necessary to move the lever *g* in the proper direction to cause the wheels *l* and *m* to mesh, when the windlass is caused to revolve and draw up the auger.

It will be observed that in this machine it is not necessary to reverse the motion of the sweep in order to elevate the auger or boring device.

The device for forcing the shaft D, with its boring-tool, downward is illustrated in Figs. 3 and 4, in which *h* represents a circular plate encircling the shaft D, and secured to the under side of the platform of the frame A. This plate has its lower face curved up and down, or scalloped, as seen in Fig. 3. Fitting around the shaft D, with just sufficient looseness to move freely up and down thereon, is a block, *i*, from one side of which projects an arm, on which is mounted a roller, *j*. The block is held up by a spring-arm, *k*, so that the roller *j* is kept constantly in contact with the lower face of the plate *h*, as represented in Fig. 3.

As the shaft D is rotated by the drum or capstan B, the roller *i* is forced downward by the downwardly-projecting portions of the plate *h*, and, being sustained or held up at the center or around the shaft D, the block *i* is caused to cramp on the shaft D, when the two are forced downward together. As the roller rides off this portion of the plate *h*, the spring *k* raises up the block, when the same operation is repeated. This forms a very effective feeding or forcing device, and one which is perfectly automatic in operation and simple in construction. When the shaft D is to be elevated the spring-arm *k* is released, when the feed ceases to operate.

In Fig. 5 is represented the improved auger, which, as shown, consists merely of a central hub or stem and two wings or blades, all cast in one piece, and the wings being provided with adjustable steel cutters or knives *c*, secured by bolts *d*. The upper end of each blade is made to overlap the lower end of the other blade, as shown in Fig. 5. This auger, being made mostly of cast-iron in one piece, is very cheap to manufacture, while the blades, being detachable, may be readily ground or replaced when worn.

It will be observed that the blades or wings of the auger are quite short, making little more than half a turn each around the central hub, and that they overlap each other. This construction avoids the expense and friction incident to the use of long spiral blades describing several turns, as usual, and at the same time, owing to the overlapping of the blades, prevents the earth from sliding back and escaping when the auger is being raised, as it would otherwise do unless a valve were employed.

I do not claim to be the originator of double-bladed augers, nor to be the first to cast an auger in one piece; but I do believe myself to be the first to make an auger in one piece of the form shown, with adjustable edges thereon.

In Fig. 6 there is represented an implement which is designed to be used in connection with the apparatus above described, and which consists in a frame or carriage for lowering masonry, brick-work, or metal tubing into wells. As shown, this consists, essentially, of four arms, *p*, pivoted or hinged in a strong head-block, H, at right angles to each other, the arms being so bent or formed as to cause their upper ends to approach each other when in position, while their lower ends are thrown out or spread apart. About midway of their length the arms *p* are each connected, by means of arms or bars *r*, to a second block, I, located centrally between the arms *p*, both of the blocks H and I being provided on their upper sides with an eye or loop, to which is secured a strong rope, as shown.

The arms *p* have their lower ends bent outward, forming shoulders or ledges, on which is placed a strong metallic plate or ring, L, the upper faces of the shoulders or ledges being slightly inclined downward toward their outer ends, as shown.

When the device is to be used, the rope attached to the head-block H is attached to the windlass, the block I allowed or caused to drop down to the position shown, thereby causing the arms or bars *r* to assume a horizontal position, and thus hold the arms *p* out, as shown, their lower ends engaging under the ring or plate L. The masonry or brick-work is then started upon the ring or plate L, and as it progresses the rope is unwound from the windlass, and the masonry or brick-work gradually lowered into the well. When it reaches the bottom, or the point to which it is intended to go, the cord or rope attached to the block I is drawn upward, elevating the block, and causing the arms *p* to be drawn together at their lower ends through the medium of the connecting-bars *r*. This action causes the lower end of the arms to be disengaged or drawn from under the plate L, leaving the same, with the masonry or brick-work upon it, free to settle into place.

If the weight of the brick-work or masonry should become too great before it is entirely completed, and thus endanger the breaking of the rope, a portion may be let down at a time until the whole is in place.

As the boring progresses, additional sections may be placed upon the shaft D from above, and coupled or connected therewith, as usual.

The device may, manifestly, be made in various forms; but that above described is deemed preferable.

Having thus described our invention, what we claim is—

1. In a well-boring machine, the combination of the boring rod or shaft D, the drum B, having the sweep C, the upright overhanging arm M, and rope *w*, as and for the purpose described.

2. In combination with the rotary boring-shaft D, the cam-plate $h$, feeding-dog $i$, and spring $k$, substantially as shown.

3. The boring-rod D and its actuating-drum B, in combination with the drum E, arranged in close proximity to the rod, intermediate gearing connecting the drums B E, and the lifting-cord connecting the drum E and the boring-rod, substantially as shown.

4. The auger G, cast in one piece with the two short overlapping blades and the conical point, and provided with the adjustable knives on its edges, as shown.

CHARLES B. HEWITT.

Witnesses:
JOHN W. KNIGHT,
WM. ASBY.